US008829412B1

(12) United States Patent
Papson

(10) Patent No.: US 8,829,412 B1
(45) Date of Patent: Sep. 9, 2014

(54) REMOTE MONITORING OF GLOW TUBE LIGHT OUTPUT INCLUDING A LOGIC UNIT MAINTAINING AN INDICATION OF A MONITORED GLOW TUBE DISCHARGE WHILE NO DISCHARGE IS DETECTED

(75) Inventor: John Christopher Papson, Melville, NY (US)

(73) Assignee: DGI Creations, LLC, Raleigh, NC (US)

( * ) Notice: Subject to any disclaimer, the term of this patent is extended or adjusted under 35 U.S.C. 154(b) by 679 days.

(21) Appl. No.: 13/093,406

(22) Filed: Apr. 25, 2011

(51) Int. Cl.
  *H01J 40/14* (2006.01)
  *G01J 1/32* (2006.01)
  *G05F 1/42* (2006.01)

(52) U.S. Cl.
  CPC .. *H01J 40/14* (2013.01); *G05F 1/42* (2013.01)
  USPC ........................................ 250/214 R; 250/205

(58) Field of Classification Search
  CPC ..... H01J 2893/0061; H01J 3/025; H01J 3/08; H01J 40/14; G01R 19/16576; G01R 19/16566; G01R 1/30; G01R 19/155; G01R 19/145; G01J 1/00; G01J 1/58; G01J 1/10; G05F 1/42; G05F 1/40; G05F 3/12
  USPC ............... 250/214 R, 214 DC, 205, 551, 206, 250/208.2, 214.1; 324/403, 414, 122, 123 R, 324/149, 72, 76.44, 410; 340/660, 600, 340/641, 646, 635, 661; 315/94, 105, 106, 315/107, 136, 150, 157, 208, 276, 291, 307, 315/308; 313/124, 619
  See application file for complete search history.

(56) References Cited

U.S. PATENT DOCUMENTS

| 2,575,279 | A |   | 11/1951 | Linton        |         |
|-----------|---|---|---------|---------------|---------|
| 3,168,728 | A | * | 2/1965  | Porath        | 340/660 |
| 3,754,149 | A | * | 8/1973  | Thompson, Jr. | 307/117 |
| 3,786,460 | A | * | 1/1974  | Kaltenbach    | 340/555 |
| 3,904,922 | A | * | 9/1975  | Webb et al.   | 315/151 |
| 3,999,087 | A | * | 12/1976 | Compton       | 324/107 |
| 8,358,083 | B2| * | 1/2013  | Olsen et al.  | 315/291 |

OTHER PUBLICATIONS

Chemical of the Week—Gases that emit light, 2 pages, as obtained on Oct. 16, 2010 from http://scifun.chem.wisc.edu/chemweek/gasemit/gasemit.html.

* cited by examiner

*Primary Examiner* — Que T Le
*Assistant Examiner* — Jennifer Bennett
(74) *Attorney, Agent, or Firm* — Kevin E. Flynn; Flynn IP Law

(57) ABSTRACT

A glow tube output detection device that monitors for light emissions from a legacy glow tube so that the status of the glow tube may be fed to other systems such as supervisory control and data acquisition (SCADA) systems for electric power distribution networks. The monitored legacy glow tubes are connected to the various phases of electrical buses to indicate the presence of high voltage including back feeds.

7 Claims, 15 Drawing Sheets

FIG. 2

REMOTE MONITORING OF GLOW TUBE LIGHT OUTPUT INCLUDING A LOGIC UNIT MAINTAINING AN INDICATION OF A MONITORED GLOW TUBE DISCHARGE WHILE NO DISCHARGE IS DETECTED

BACKGROUND

Field of the Disclosure

This disclosure relates generally to supervisory control and data acquisition (SCADA) systems for electric power distribution networks. More particularly, this disclosure relates to glow tubes used to indicate the presence of high voltage including back feeds on electrical networks.

Electrical distribution networks seek to distribute power from generators to end users through a series of components including transformers, buses, and network switches. These networks are generally designed to provide electricity in one direction but there are times where network conditions cause current to flow in the opposite direction. This condition is known as back feed and is not desired.

In order to provide context it is useful to start with a simplified network diagram.

A simplified drawing is provided in FIG. 1 to introduce certain relevant components. As the focus of this application is on the process for monitoring the output of the glow tubes in the switchyard, many relevant components that would be present in an actual power grid distribution system have been omitted.

A portion of an electrical distribution network is shown as network 100. Network 100 has feeder bus 104, feeder bus 108, and feeder bus 112. A representative voltage for operation of these feeder buses may be 13 kV but other systems may operate at 27 kV, 34 kV or some other voltage. The power on these three buses is provided to a set of local distribution networks 116 to serve loads represented by 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, and 112). Even when the load can consistently be serviced by just one feeder bus, a desire for reliability leads to providing a redundant path for providing service in case of equipment failure, scheduled maintenance, load balancing, or other needs. Actual networks may have more than three possible feeder buses connected to a particular local distribution network but simplified FIG. 1 is sufficient for introducing the concepts relevant to the present invention.

The local distribution networks 116 are coupled to the feeder buses 104, 108, and 112 through transformers 150 and related equipment. The transformers 150 convert the relatively higher voltage on the primary side 154 of the transformers 150 to the relatively low voltage on the secondary side 158 of the transformers 150.

The transformers 150 are connected to the feeder buses (104, 108, and 112). The feeder buses may be isolated from the network by disconnect switches 162. Primary fuse links 174 may exist adjacent to the disconnect switches 162. The transformers 150 have network protectors 166 on the secondary side 158 of the transformers 150 to isolate the transformers 150 from the local distribution networks 116 as needed to protect the transformers from current flowing from the distribution networks 116 to the primary side 154 of the transformers (known as back feed).

Additionally, some networks include sets of fuse links 170 between the network protectors 166 and the local distribution networks 116.

The feeder buses 104, 108, and 112 can be isolated by a set of substation breakers 178 from the substation buses 182 that are the next portion of the transmission network which is ultimately connected to a set of power sources that drive generators. The power sources are symbolically represented here by turbine 190.

FIG. 1 shows a small portion of the network which may have more feeder buses and many more local distribution networks 116 providing power to many more loads. These loads may be distributed around a portion of a city. The various transformers 150 may be in pits (vaults) near the various loads.

Back Feed

Continuing with FIG. 1, assume all three substation breakers 178 (including breakers 204, 208, and 212) are closed so that all three transformers 224, 228, and 232 are energized and supplying current to a local distribution network 116 providing power to load 128. Assume that the operators of the network open substation breaker 212 to de-energize feeder bus 104.

Once feeder bus 104 no longer provides high voltage to the primary side 154 of transformer 232, the network protector 252 should sense a change in network conditions and open to isolate the secondary side of transformer 232 from the voltage on local distribution network 116 as that bus is still being fed current by transformer 224 from feeder bus 112 and from transformer 248 from feeder bus 108.

If for some reason, the network protector 252 fails to open, then the secondary side 158 of the transformer 232 will pass current to the primary side 154 of the transformer 232 to provide high voltage between the primary side 154, of transformer 232 all the way back to the substation breaker 212. Thus, the feeder bus 104 will be at the high voltage (perhaps 13 kV) and will energize other transformers connected to that feeder bus including transformers 264 and 268.

Back feed is undesirable for a number of reasons including that it decreases the useful life of transformers and wastes energy but it also makes a bus thought to be de-energized into an energized bus. While the components drawn in FIG. 1 are shown adjacent to one another, the distance between transformer 232 and substation breaker 212 may be 20 miles so a considerable bus is being energized with potentially lethal voltage.

Glow Tubes

Switchyards and substations have employed glow tubes that provide an indication of the presence of high voltage on a conductor. These glow tubes give off visible light as the voltage on the conductor causes ionization of the gas within the glow tube. The glow tubes indicate the presence of high voltage including high voltage that is expected as the bus is energized and providing power to a transformer and when there is back feed providing high voltage to a de-energized bus. High voltage on a conductor that is expected to be de-energized is an extremely hazardous condition for repair crews.

Figure 2:
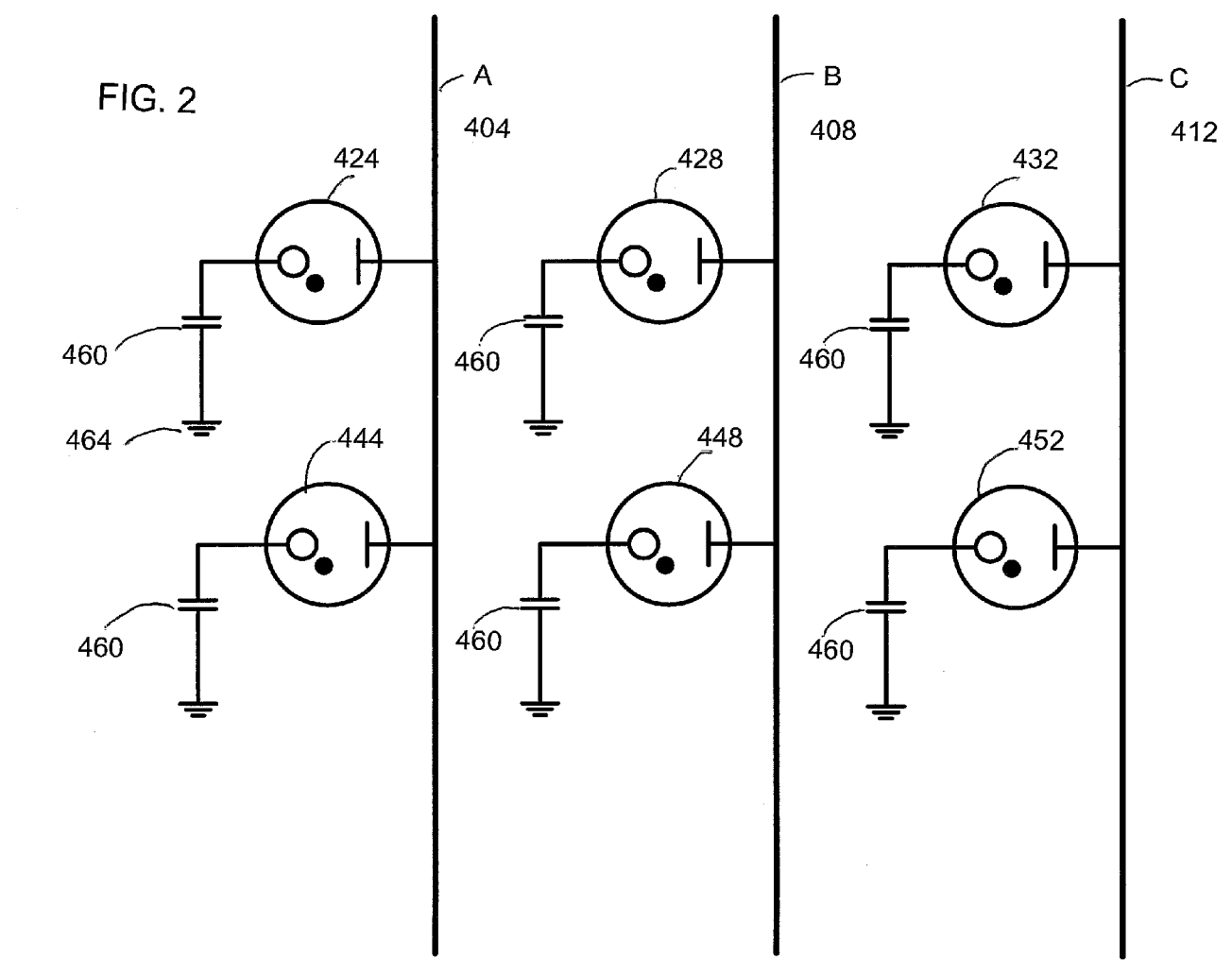

FIG. 2 shows a series of glow tubes connected to the three phases of the feeder bus. These items are not shown in FIG. 1 but would be between substation breaker 212 and the pick-up coil 272. Specifically, the three phases 404, 408, and 412 of feeder bus 104 each have a glow tube 424, 428, and 432 connected to the bus bar within the pot head cabinet. Each glow tube has an effective capacitance 460 connecting the glow tube to ground 464. The effective capacitance is unlikely to be the same for the path to ground for each glow tube.

For the sake of redundancy, it is common to have a second set of glow tubes 444, 448, and 452 so that each phase 404, 408, and 412 has two glow tubes per phase. The redundant set of glow tubes makes it less likely that an energized phase of a bus will fail to be appropriately identified as having high voltage as ideally at least one of the two glow tubes should be functioning correctly.

The glow tubes are positioned so as to be visible through a window that allows an operator to peer into the enclosed high voltage equipment of the pot head.

As the operation of switchyards has evolved from having operators walk around looking for indications of a problem such as a glowing glow tube on a feeder bus intended to be out of service, to systems with a heavy reliance on supervisory control and data acquisition (SCADA), it would be useful to have a detection unit that may monitor these legacy glow tubes from outside of the high voltage equipment and relay to a remote location the status of a glow tube.

Complications

The ability to detect the status of a glow light is complicated by the presence of ambient light. One source of ambient light is sunlight which changes in intensity during the day and during the year. Not only does the intensity level of sunlight change, but the orientation of the sunlight varies over time with respect to a particular glow tube.

Another source of ambient light is from incandescent, fluorescent, or gas vapor lighting. These light sources all have characteristic wavelengths or bands of wavelengths. Some of this lighting may be on timers or connected to photo sensors so that these sources are not constant. Additional changes to the ambient lighting around the glow tubes can come from the movement of people or equipment which may cast a shadow over the glow tube. An operator may use a flash light or other light source when making an inspection or performing some other task near the glow tube.

SUMMARY

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 2 shows a series of glow tubes connected to the three phases of the feeder bus.

DETAILED DESCRIPTION

Figure 1:
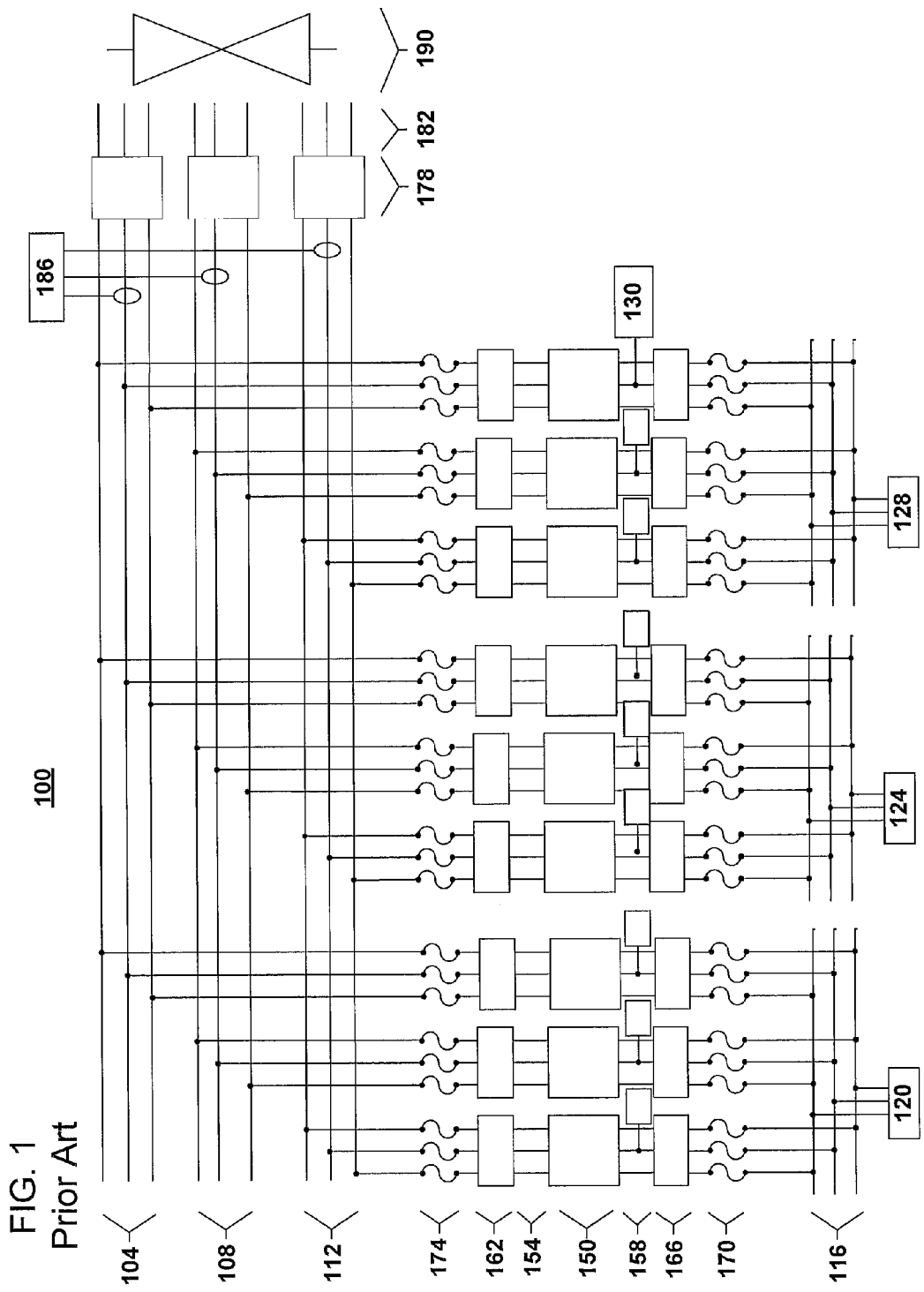
FIG. 1 is a simplified network diagram.

The teachings of the present disclosure may be used to detect visible output from a type RS glow tube high voltage presence indicator from Glow Tube Inc.

Typical installation on a high voltage alternating current bus structure consists of mounting one end of the glow tube directly to the bus via a properly sized fuse clip. The opposite end of the glow tube either is left unconnected, or connected to a small "capacitance plate".

The current path through the glow tube is from the high voltage bus to ground via the stray capacitance to ground from the unconnected end of the glow tube. Typically, this capacitance is in the order of 10 to 100 pico Farads. When employed in an installation, the "capacitance plate" is used to increase capacitance to ground in order to increase the intensity of the indication from the glow tube.

It was discovered that these glow tubes, in a typical installation, do not emit a continuous illumination, but rather short bursts of high intensity pulses of light.

Initially, at the minimum detection voltage, the glow tube will emit a single pulse of light on the positive going slope of the AC voltage wave form, and a second pulse of light on the negative going slope of the AC voltage waveform.

As the AC voltage is increased, the number of pulses of light on each slope of the AC voltage waveform will increase.

The intensity of the glow tube is not a linear function of the applied voltage, but rather increased in a series of steps, each step being an additional pulse (or pair of pulses) per AC voltage cycle.

The typical length of the illumination period of the glow tube has been observed to be in the order of a few microseconds to tens of microseconds, depending upon the field installation. Typically, the voltage level of the bus impacts the number of pulses per cycle but the capacitance impacts the duration of each pulse.

Due to the low resistance of the current path through the glow tube, the current through the glow tube is in the order of several Amperes when it is conducting, resulting in very bright pulses of light.

A device to detect the visual output from a glow tube can be adapted to look for short pulses of high intensity light as indicative of glow tube output rather than from other light sources.

More specifically, it has been observed that as the capacitance to ground is charged during flow of current across the glow tube, the voltage differential between the two ends of the glow tube drops as the voltage found on the charged effective capacitor rises. When the voltage differential is too low to support continued emission of light, the light stops. This differential will be different for different glow tubes but as an example, the minimum voltage difference may be 67 volts for one type of glow tube.

Example of a Glow Tube Output Detector

In order to implement a glow tube output detector without opening the housing containing the glow tube, a lens may be at least partially aligned with an output window that provides light output from a glow tube. The lens may not be totally aligned as there may remain a desire to provide an observation window aligned with the output of the glow tube.

Alternatively, the glow tube output connector may view the glow tubes through a path that does not use the window used by operators to view the glow tube. A peep hole through the high voltage cabinet may be added with a lens that takes light from the vicinity of the one or more glow tubes for a phase of the feeder bus and concentrates this light on an array of photo-detectors. In some installations the existing observation window used by the human observer may be directly in line with the glow tubes or it may be out of line with the glow tubes and thus the human observer must look at an angle to see the glow tubes through the observation window.

If the glow tubes are not in line with the observation window, then the peep hole may be positioned in line with the glow tubes.

If the glow tube output detector is placed within the housing rather than outside the housing, then the glow tube output detector may need to be a minimum safe distance from the high voltage bus equipment which includes the glow tube. The minimum safe distance may be in the range of just a few inches up to more than 12 inches from the glow tube depending on the operating voltage of the conductor.

Lens

A suitable optical system can be a simple cylindrical lens. The lens may be positioned to have the axis of the cylinder positioned to produce a focused vertical line of light that falls upon a rectangular photo detector, or an array of photo detectors that form a rectangle. For a preferred placement on the housing above the glow tubes and assuming the glow tube is mounted in a plane parallel to the face of the cabinet house, using half a concave lens one may obtain adequate monitoring of a space about 4 inches wide to between 8 to 12 inches high. Hence the lens may act both as a prism or wedge to bend the beam downward, and to also spread the beam wider in the vertical dimension.

Wavelength Filtering

Optionally, the globe tube detection system may filter based on wavelength to filter out light wavelengths from infra-red and ultra-violet so that you leave a band of light frequencies that are in the visible range and will contain the visible light expected from the glow tube. The gas type will drive the characteristic wavelengths of the light that comes out as the electrons hop from orbital energy level to energy level.

Alternatively, rather than filtering, a photo detector with a peak sensitivity at the spectral emissions of neon may be used to favor light from the glow tube over other light sources.

Processing the Output from the Photo Detector

The output from the photo detector (after filtering or not filtering for a particular range of light frequencies/wavelengths) would be a time varying voltage that indicates the intensity of light received by the photo detector. At this point the output from the photo detector is decoupled from the frequencies of light that produced the output and now you are looking at the change in energy intensity detected over time.

The circuitry and logic to implement the next task can be done in a wide variety of ways. At a high level, the task is to look for light pulses that come in short intense bursts of 1 to 10 microseconds. Thus, all that is of interest is short bursts of increased intensity relative to the photo detection readings for ambient light. In this context a flash light from an operator that is shined through the observation window onto the glow tubes will change the new level for ambient light and be ignored. As the discharges from the glow tube to ground are not precisely timed relative to the zero crossing of the alternating current, these discharges must be handled as asynchronous discharges. Depending on the voltage level, there may be several discharges per half cycle rather than just one.

Note—for a particular type of glow tube with a short arc chamber, a different type of glow tube detection logic may need to be employed if that glow tube conducts over most of the 60 Hz cycle. A glow tube detector focused on detecting bursts of 10 microseconds or less will not reliably detect a glow tube that is lit most of the cycle as it will impact the ambient light level.

One implementation uses a single pole high pass filter with the pole at 150 kHz although the pole could be lower such as 750 Hz. Either value is well above the 60 Hz alternating current for this power distribution network. Thus, light that comes from half the 60 Hz cycle, (8.33 ms bursts) would be ignored. A single pole high pass filter value set up this high would avoid the influence from lighting from mercury vapor, metal halide, or high pressure sodium lamps.

A band pass filter may be used instead of a high pass filter to eliminate high frequency signals that are much higher than the expected burst lengths. A low pass pole may be added to at around 400 kHz. The one pole high pass filter has a coupling capacitor and a load resistor. The one pole low pass filter has the board and detector capacitor working against load resistance.

Extending the Output Indication Detection

Figure 7:
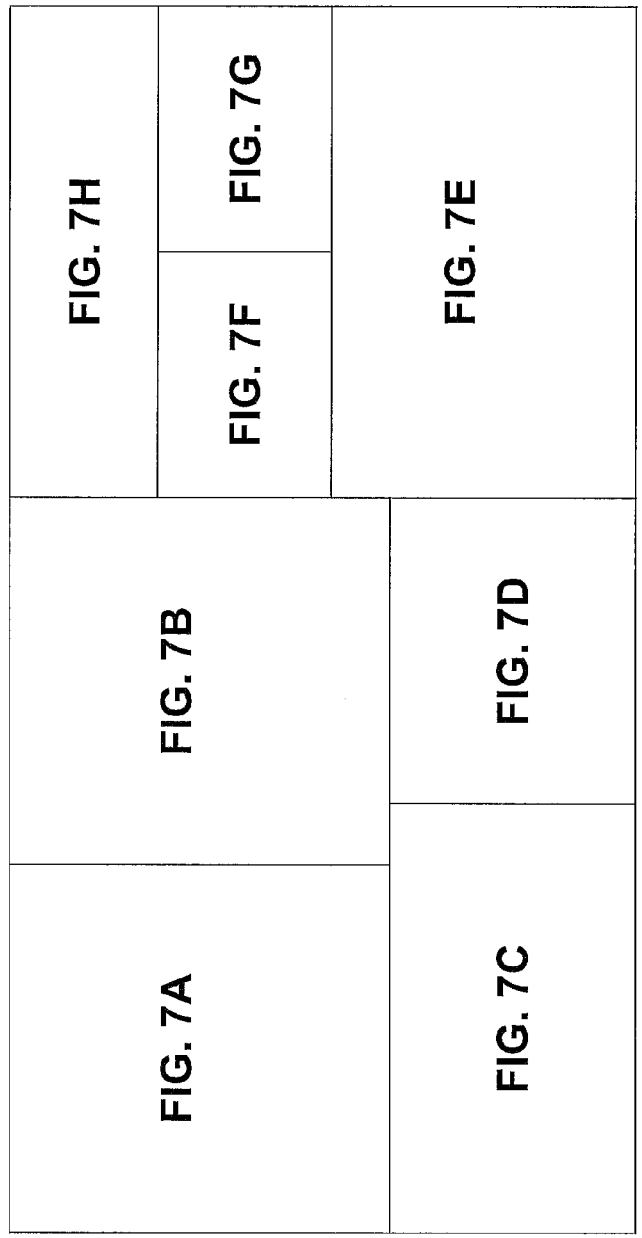
FIG. 7 with partial views FIGS. 7A-7H provide a sample circuit for a glow tube detector device. The approximate relationship between the partial views is provided by FIG. 7 and alignment guides on the individual partial views allow for alignment of the partial views given the guidance from FIG. 7.

Optionally, any detection of glow tube pulses of appropriate pulse width and intensity can be presented for an extended period. For example, any output received by the glow tube output detector and recognized as a glow tube burst can cause the detector to output a glow tube detected signal for a fixed period of time. Setting this period of time ("stabilized period") to 8 to 10 seconds would provide a stable output even if the glow tube is flickering. By flickering, it is meant that the glow tube is failing to respond to high voltages for a period on the order of magnitude of a second. This is different from the proper operation of the glow tube which has a number of pulses per cycle of high voltage current. There are a number of ways to add this stabilization period to the operation of the glow tube detector. One way to provide this extended output is a re-triggerable pulse stretching circuit. See also FIG. 7 with a sample circuit for a glow tube detector device.

This stabilized output such as the output from the pulse stretcher circuit can be used to provide a local visual indication on the glow tube detector (such as a LED) to indicate that the detector recognizes that the glow tube is providing an output and the stabilized output can be communicated to other equipment including SCADA equipment to indicate that the glow tube is indicating the presence of high voltage. If this high voltage is not expected, then it may indicate the presence of back feed.

The stabilization period may be some time other than 8 to 10 seconds such as five or even 20 seconds. The stabilization period will cause the glow tube detector to report that the glow tube is emitting light for a short period after the glow tube has ceased.

As the bus may have one or more glow tubes per phase, there may be a number of glow tube detectors associated with a particular bus. In many instances, there will be at least one glow tube detector per phase of the bus. Typically, there are two glow tubes per phase.

Alternatively, one glow tube detector may use a lens to allow the glow tube detector to respond to two or more glow tubes providing an indication for a single phase.

Fail Safe

The glow tube detector may be configured so that a loss of power to the glow tube detector results in an indication of the presence of high voltage. The glow tube detector may be configured so that failures in the operation of the glow tube detector internal circuitry result in an indication of the presence of high voltage.

Figure 7A:
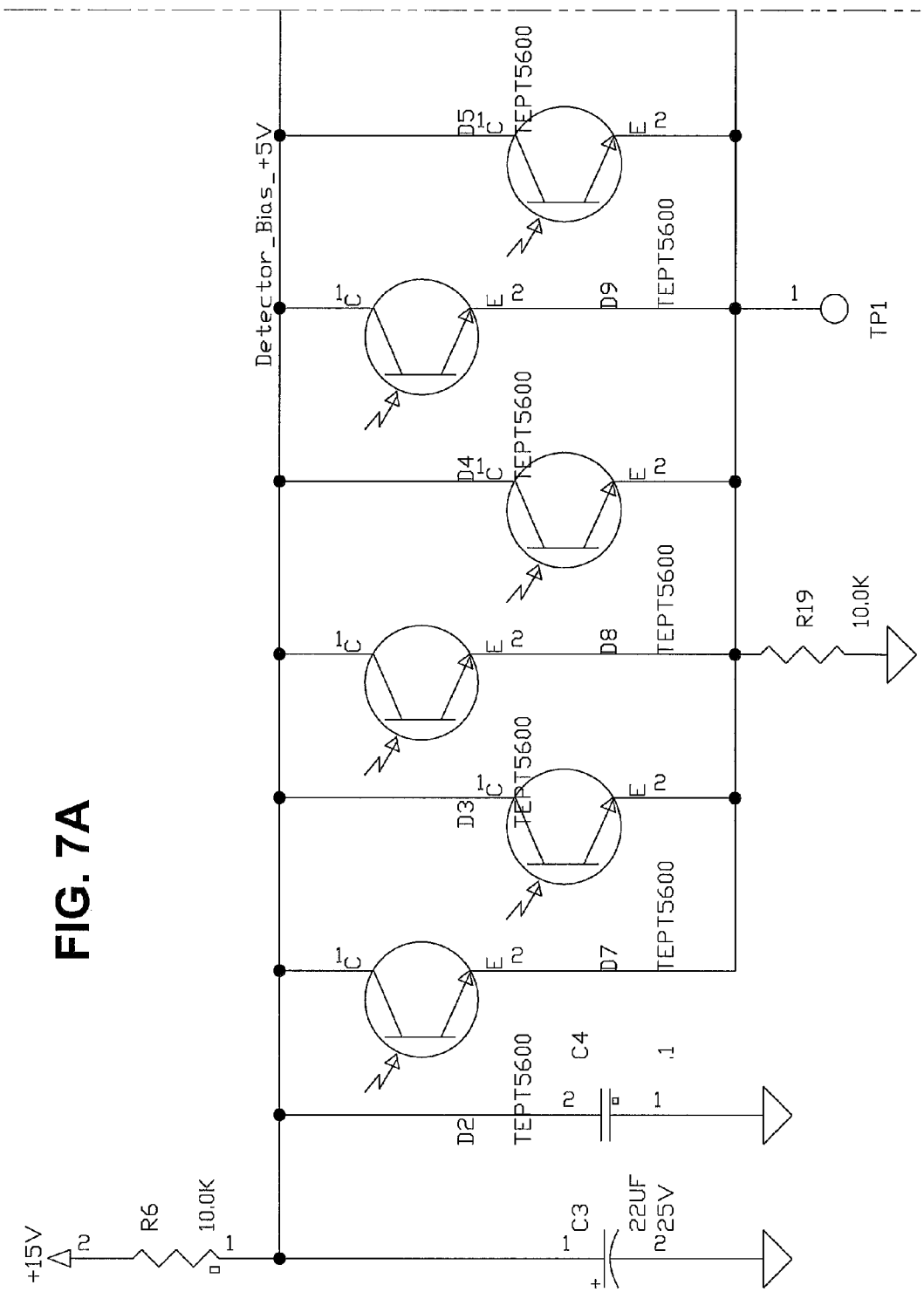
Figure 7B:
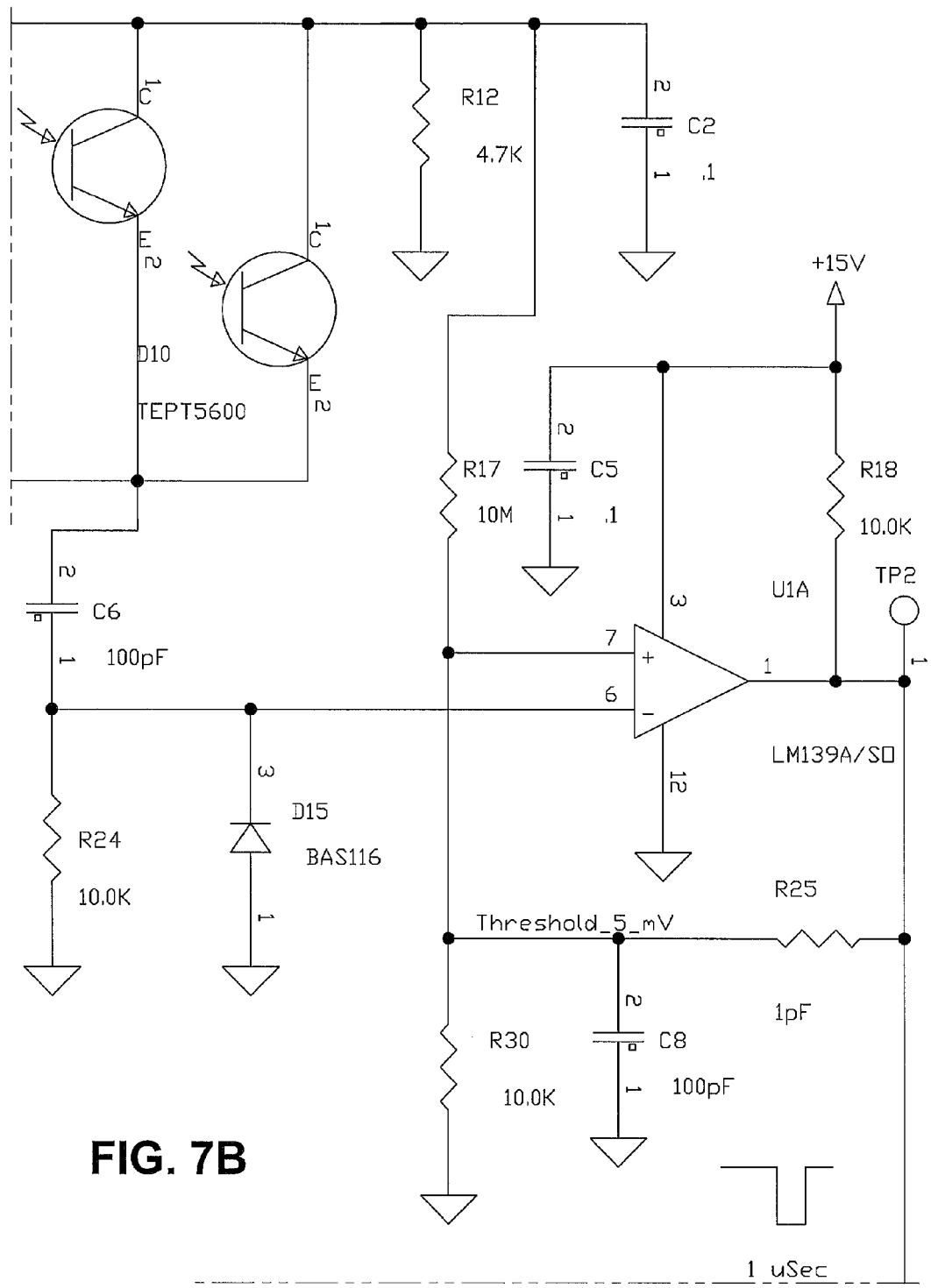
Figure 7C:
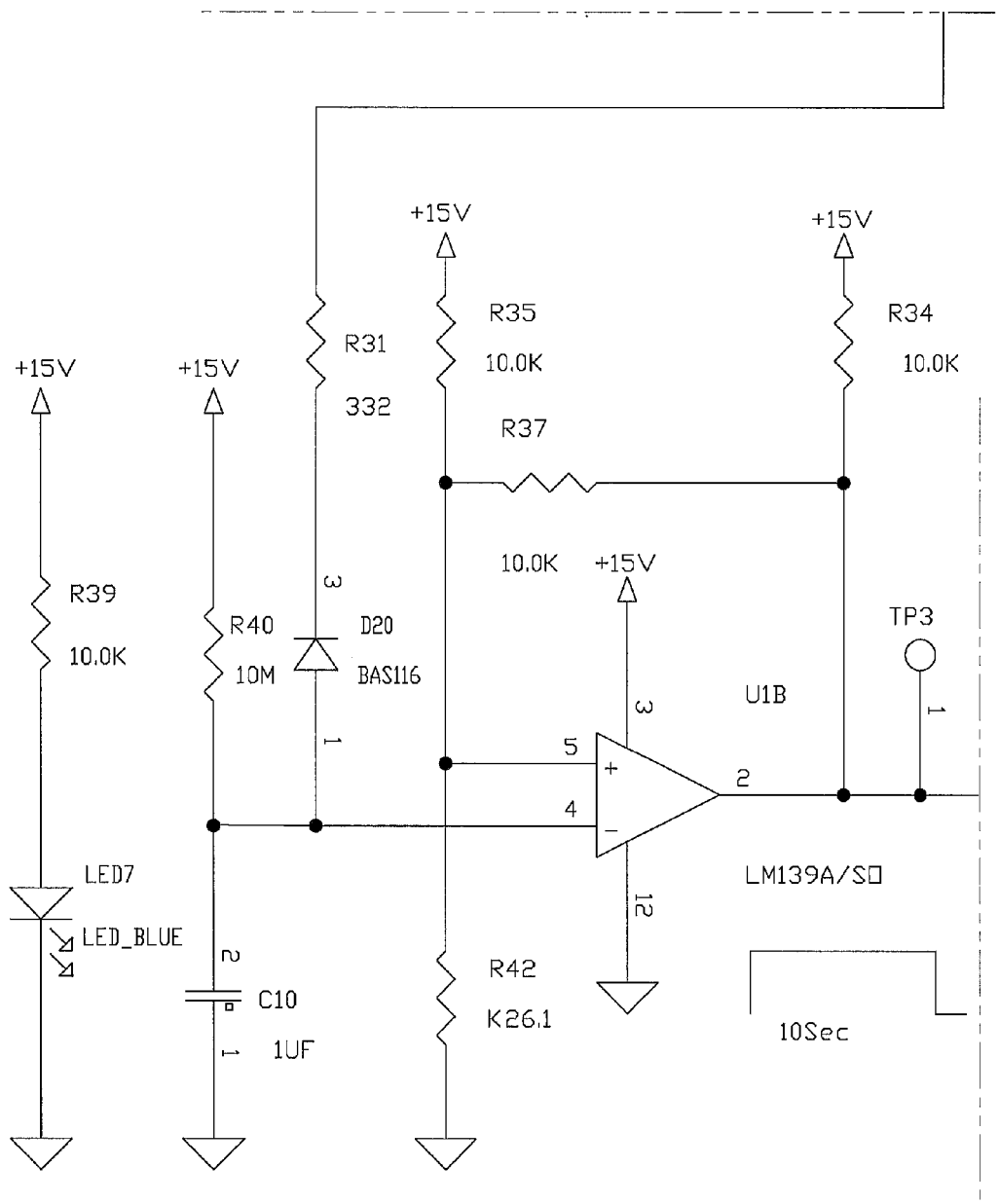
Figure 7D:
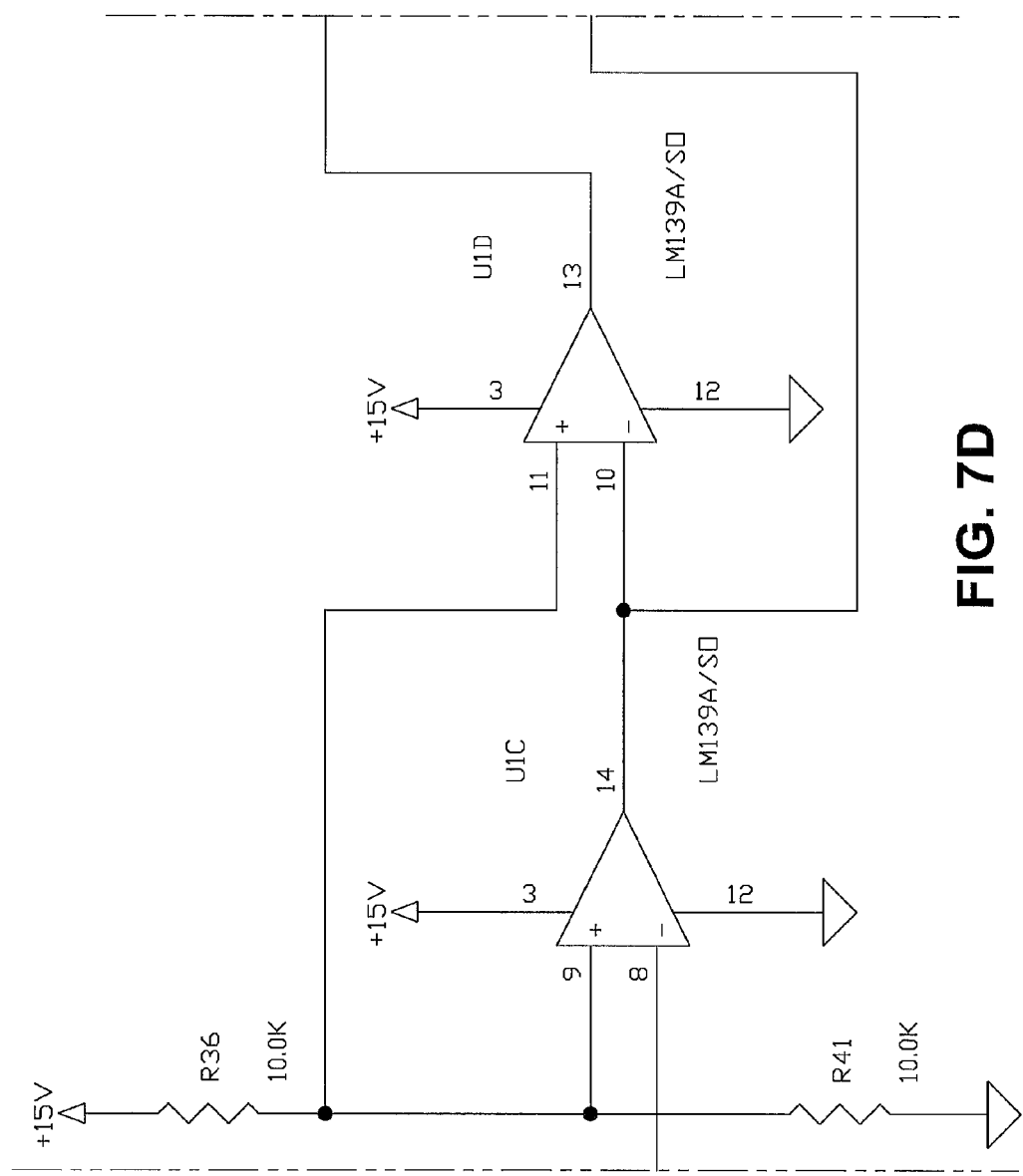
Figure 7E:
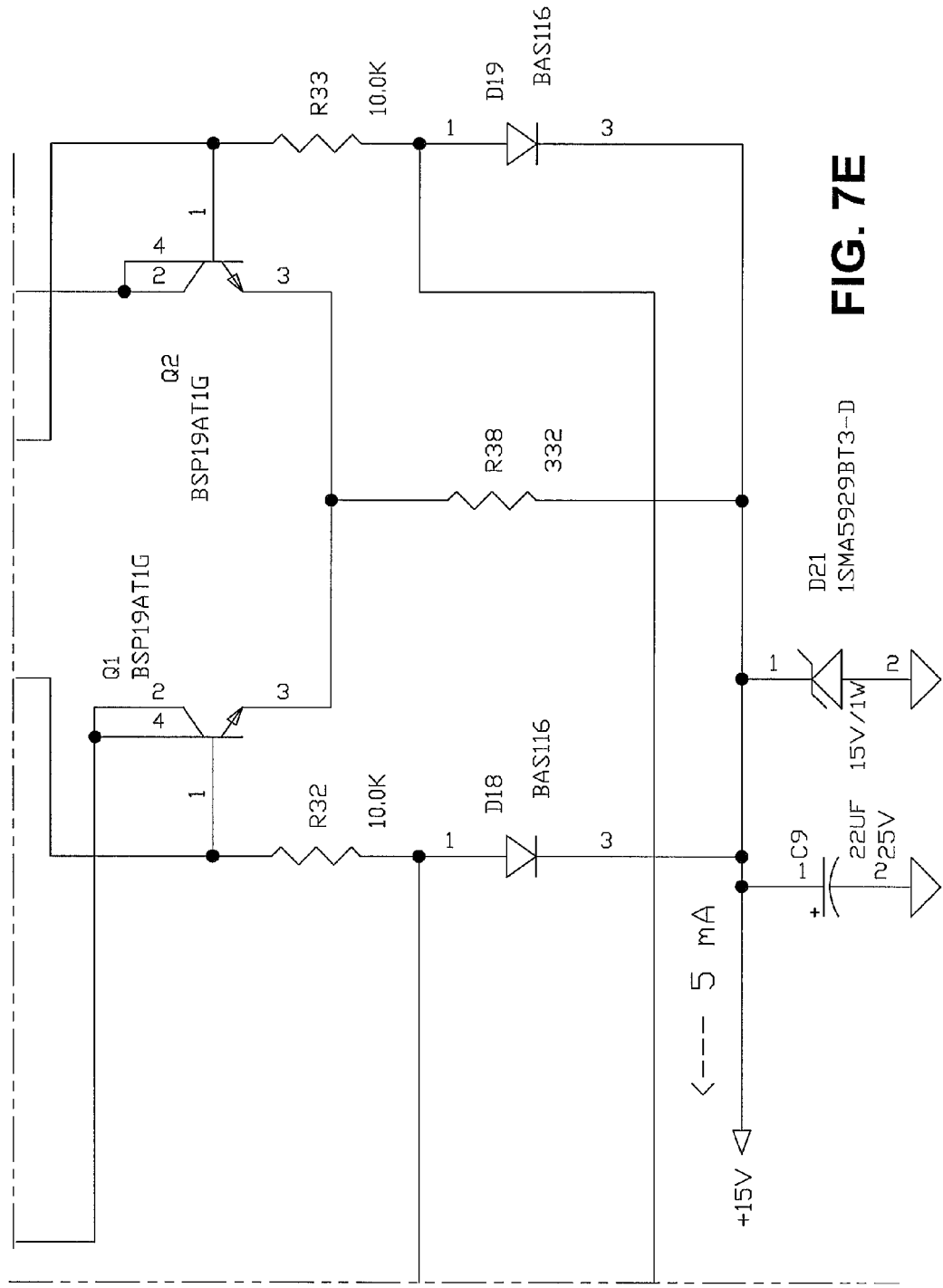
Figure 7F:
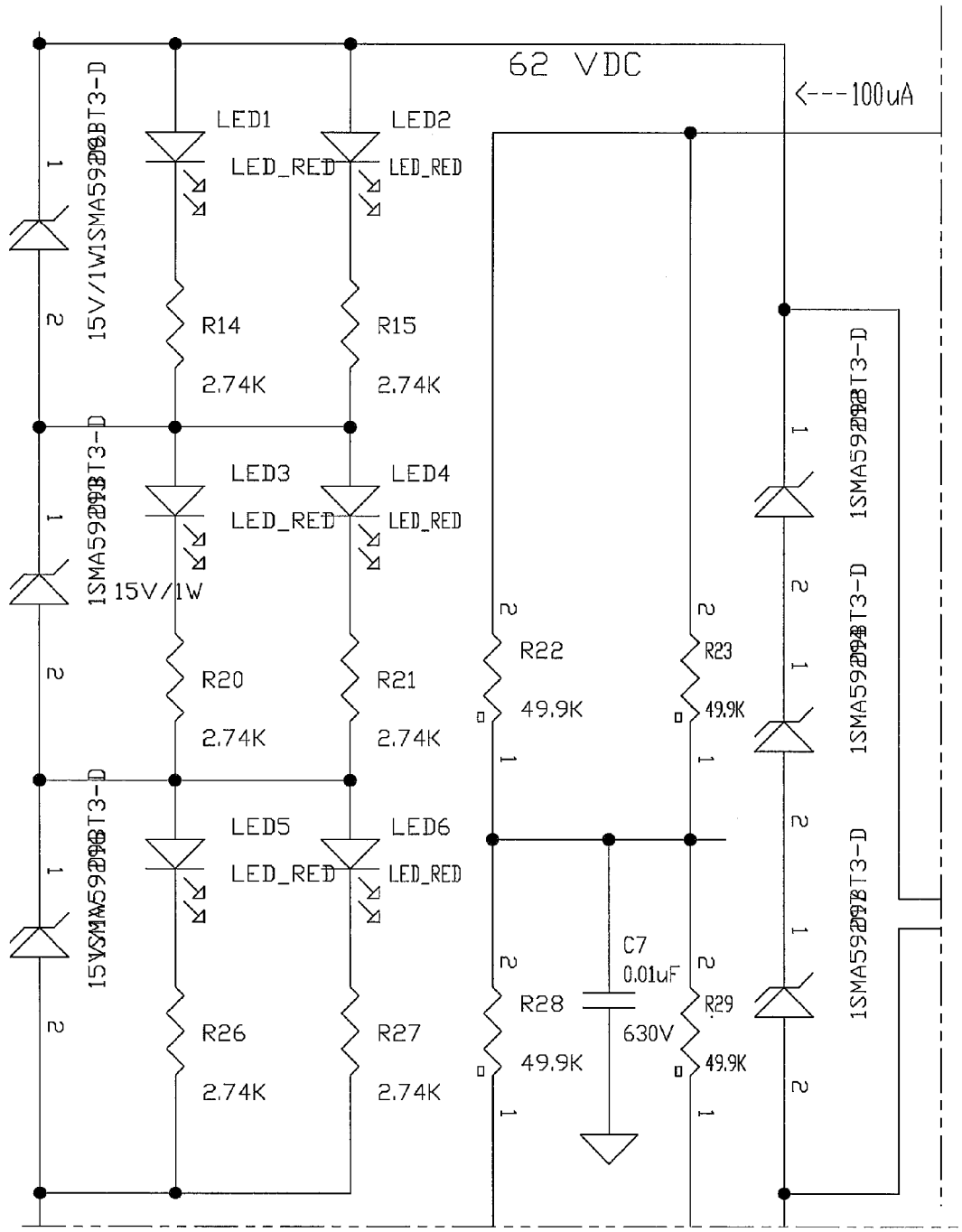
Figure 7G:
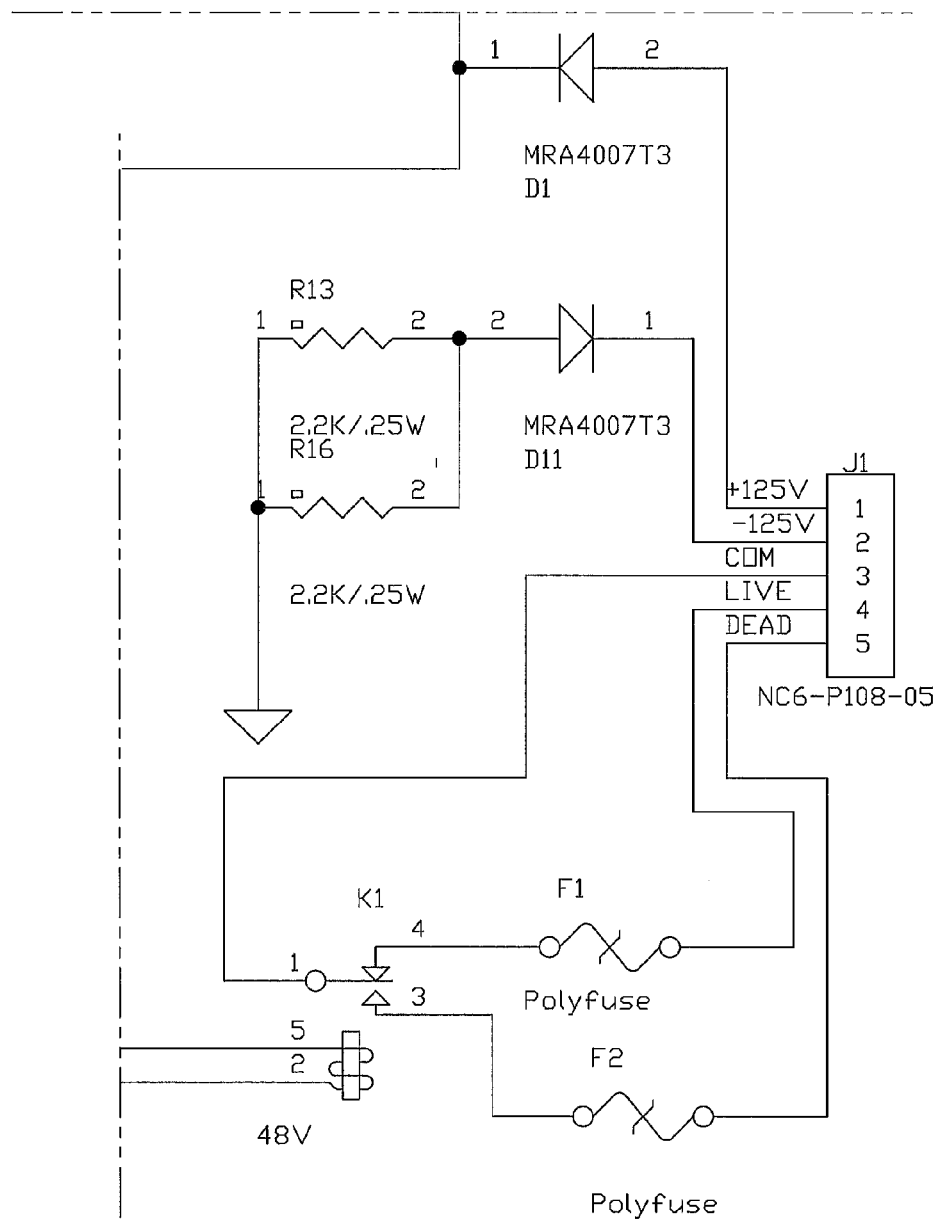
Figure 7H:
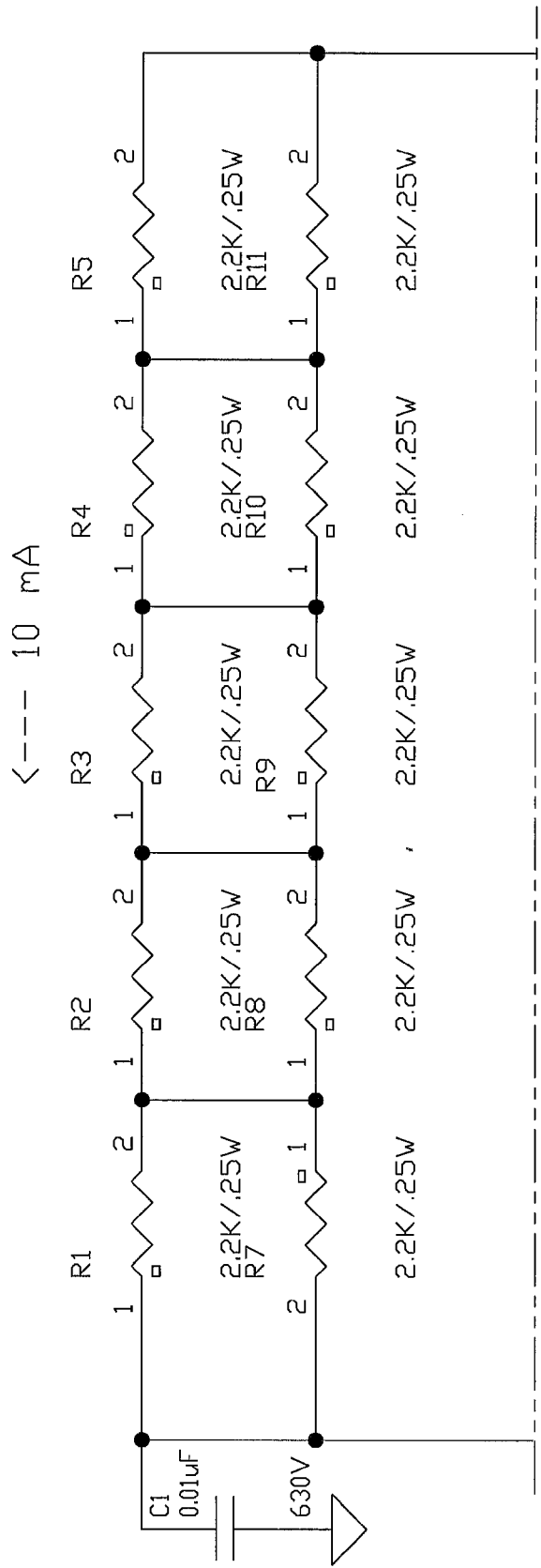

The glow tube detector may be arranged to have multiple red LED outputs to indicate glow tube output (or fail safe output). Thus, if one LED should fail, there will still be an indication of the presence of high voltage. The circuit in FIG. 7B has an array of six LED lights as the output for a single monitored phase.

The glow tube detector may have a different visible indication such as a single blue LED to indicate that the glow tube detector is receiving operating power. The glow tube detection equipment will typically be provided operating power from the switchyard battery system. This added power indication will allow an observer to detect that the red LED output is a fail safe condition from a failure to receive operating power.

The LED or other indicator used to indicate the presence of high voltage needs to have a long operating life as most of the time, the indicator will be indicating the presence of high voltage as the bus is in service and is providing power to the network. In rare instances, when the bus is removed from service, the bus may be energized through back feed.

NOTE—as the glow tube detector merely detects and relays the status of the glow tube and does not measure voltage directly, the glow tube detector is not intended to be a primary or sole indication of the presence of a dangerous high voltage. If the glow tube is not operating or if voltage is present below the threshold needed to consistently activate the glow tube, the glow tube detector will not note the presence of potentially dangerous voltage levels.

FIG. 3

Figure 3:
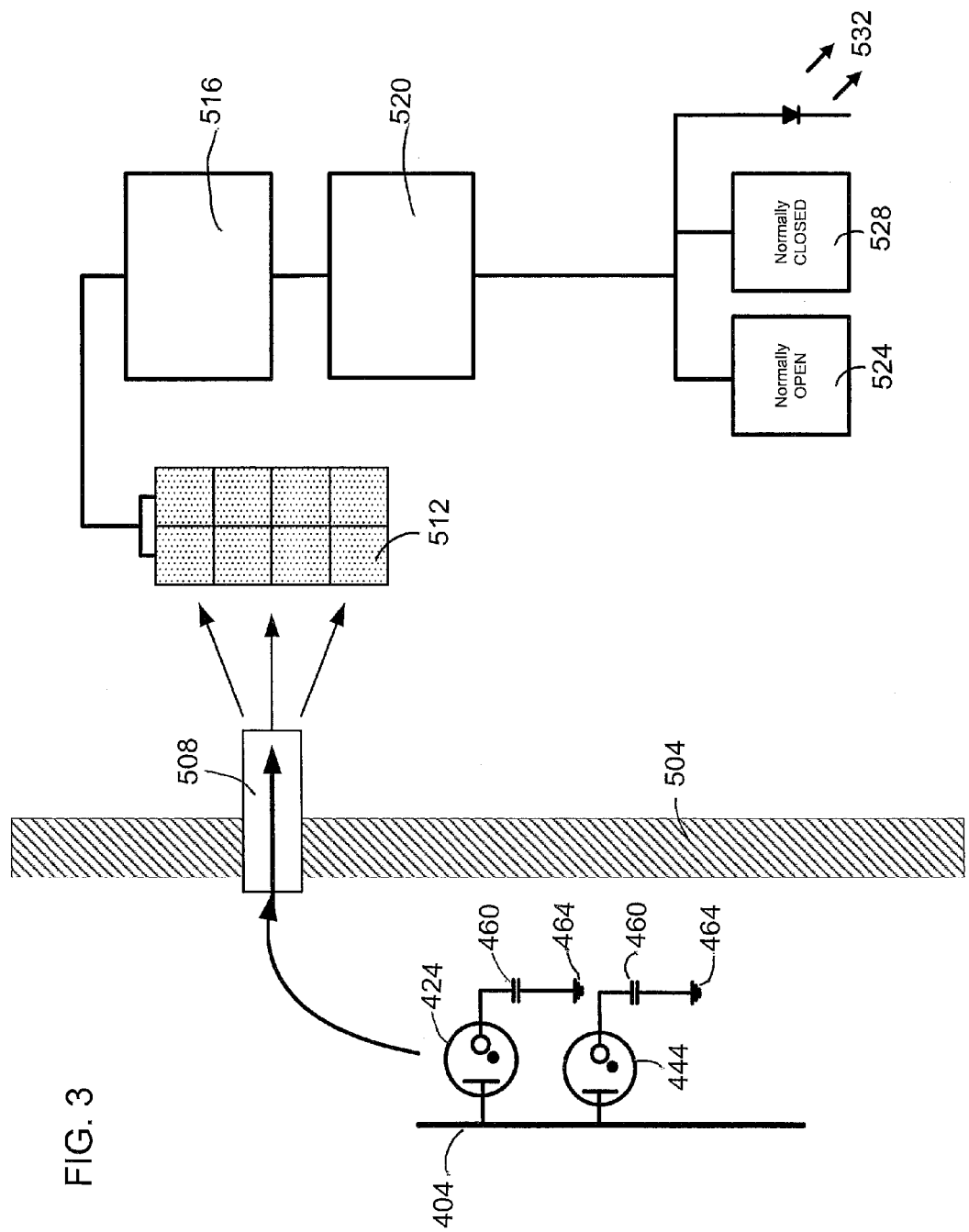
FIG. 3 provides a high level overview of one glow tube detector device.

FIG. 3 illustrates one glow tube detector device. Glow tubes 424 and 444 give off periodic bursts of light when bus 404 has voltage in excess of a threshold. Lens 508 is positioned as a peep hole through cabinet wall 504. The combination of lens type and peep hole placement is chosen to take the bursts of light from the glow tubes 424 and 444 and convey that light energy to photo detector array 512. Photo detector array 512 may include a single photo detector, but is most likely an array of several photo detectors arranged in a pattern that works well with the properties of the lens 508.

The output of the one or more photo detectors 512 is a voltage that varies with the intensity of light detected by the one or more photo detectors 512. The array of photo detectors 512 may be selected to be sensitive to the expected light wavelengths from glow tube discharges and less sensitive to other wavelengths of visible light, although this is not required.

The varying voltage output is processed by a filter 516 that discriminates against constant light sources and light components with a low frequency that tracks the fundamental frequency of the power grid (such as 60 Hz) or low order harmonics. A high pass filter with a single pole at 750 Hz may be used although other high pass filters may be used. Alternatively, an appropriate band pass filter may be used.

The output from the high pass filter may be processed in processing and logic stage 520 to discern whether the output of the high pass filter is indicative of glow tube output. A simple comparator circuit may be used to compare the output from the high pass filter with a stored value. One of ordinary skill in the art will recognize that the circuitry shown in FIGS. 7A and 7B will actually require more than one pulse before initially responding to the output from the glow tube. One of ordinary skill in the art will recognize that the choice of capacitance used in C10 will impact the stabilization period for this glow tube detector device.

One of ordinary skill in the art will recognize that the analog tools described in this specification could be replaced with digital signal processing tools to achieve the same ends.

Returning to FIG. 3, the processing and logic stage 520 may be used to control a normally open relay 524, a normally closed relay 528, and one or more visible indicators such as LED 532. These outputs are accessible to the SCADA system. Having two or more LED indicators to indicate the presence of high voltage (or the fail safe condition) adds a level of safety as the failure of a single LED will not cause the device to fail to indicate a high voltage status. The use of multiple LEDs also leads to a brighter output signal.

As noted above, the processing and logic stage 520 may be configured to maintain as output an indication of a glow tube output for a period of time ("stabilization period") such as eight to ten seconds. Providing a stabilization period will keep the system from echoing a visible flicker in the output of glow tubes that are not operating properly (flicker length on the order of magnitude of a second). The use of a stabilization period results in a consistent high voltage indication even if for some reason the glow tube is flickering for perceptible periods of time.

Lens Details

Figure 4:
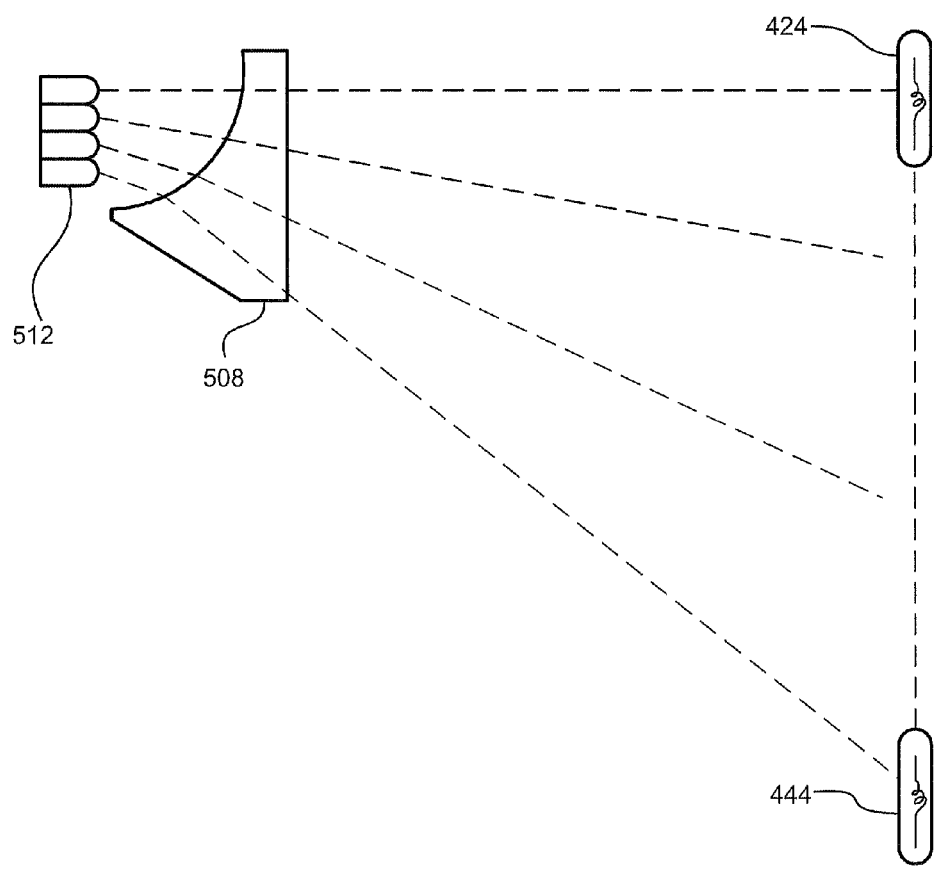
FIG. 4 shows one possible implementation of a lens that can be used to gather and focus light on a detector array to capture output from glow tubes.

FIG. 4 shows one possible implementation of a lens 508 that can be used to gather and focus light on a detector array 512 to capture output from glow tubes 424 and 444 oriented in the range of zero degrees to negative 45 degrees. This lens works for that range of angles for glow tubes located a horizontal distance from the lens of at least twelve inches. While FIG. 4 shows glow tubes 424 and 444 separated in order to show the target area for the lens 508, a more typical configuration would have both glow tubes side by side rather than separated.

The lens may be made from poly(methyl methacrylate) (PMMA) which was marketed under the trade names Plexiglas®, Lucite®, Perspex®, and others. The lens may be machined from PMMA or made in other manners such as injection molded. Those of ordinary skill in the art will recognize that other materials with suitable optical properties such as polycarbonate or glass may be used based on design choices such as cost and ease of manufacture. Dimensions of the lens will be impacted by the refractive index relative to PMMM.

Figure 5:
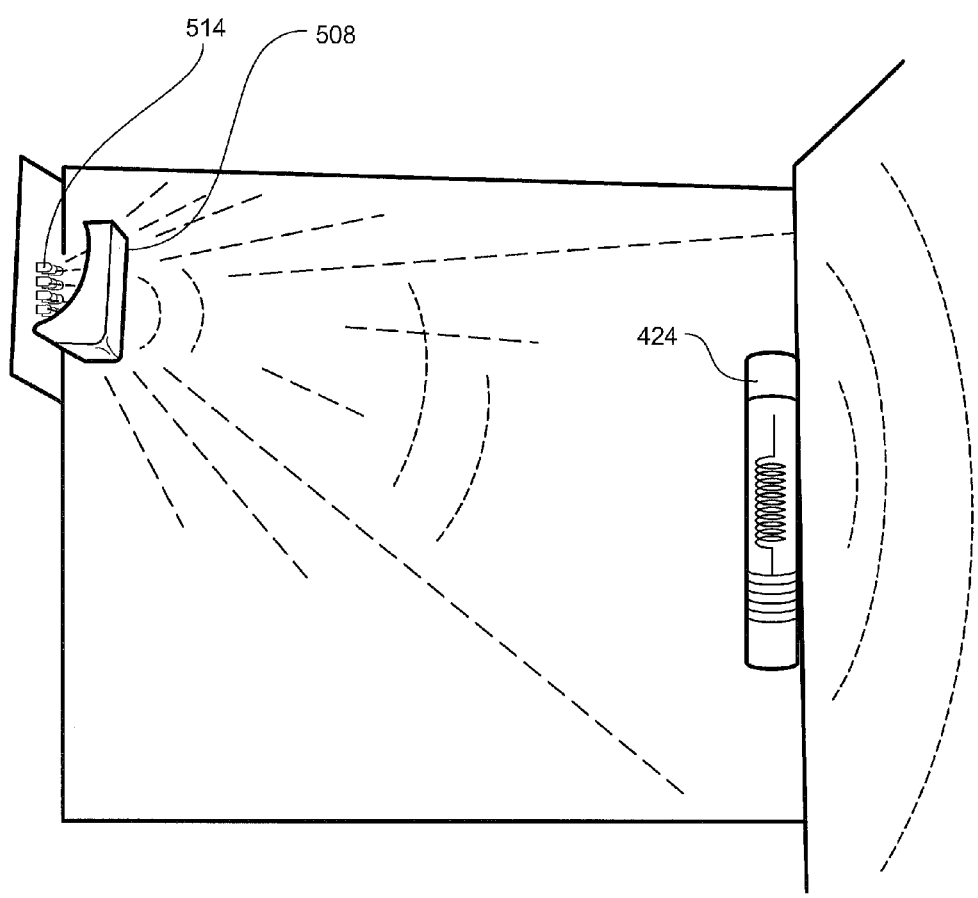
FIG. 5 demonstrates the ability of the lens to bend light.

FIG. 5 shows a glow tube 424 located approximately eleven inches from the lens 508. Twelve inches is a standard distance for keeping equipment from 33 kV. The cabinet wall will be at least this distance from an energized 33 kV bus. The glow tube detection equipment may be connected to the outside of the cabinet with a window looking in. The glow tube detection equipment may be configured to avoid protruding through the window into the cabinet in order to maintain the twelve inch safe distance. As the glow tube 424 is not connected to a high voltage source in FIG. 5, an array of lights 514 is positioned next to the lens 508 to project light on a single glow tube 424 located at approximately negative twenty-two degrees. As the effect of a lens is bidirectional, shining a light through a lens from where the light detector array would be located illustrates the field where light would be captured and passed to a light detector array.

Figure 6:
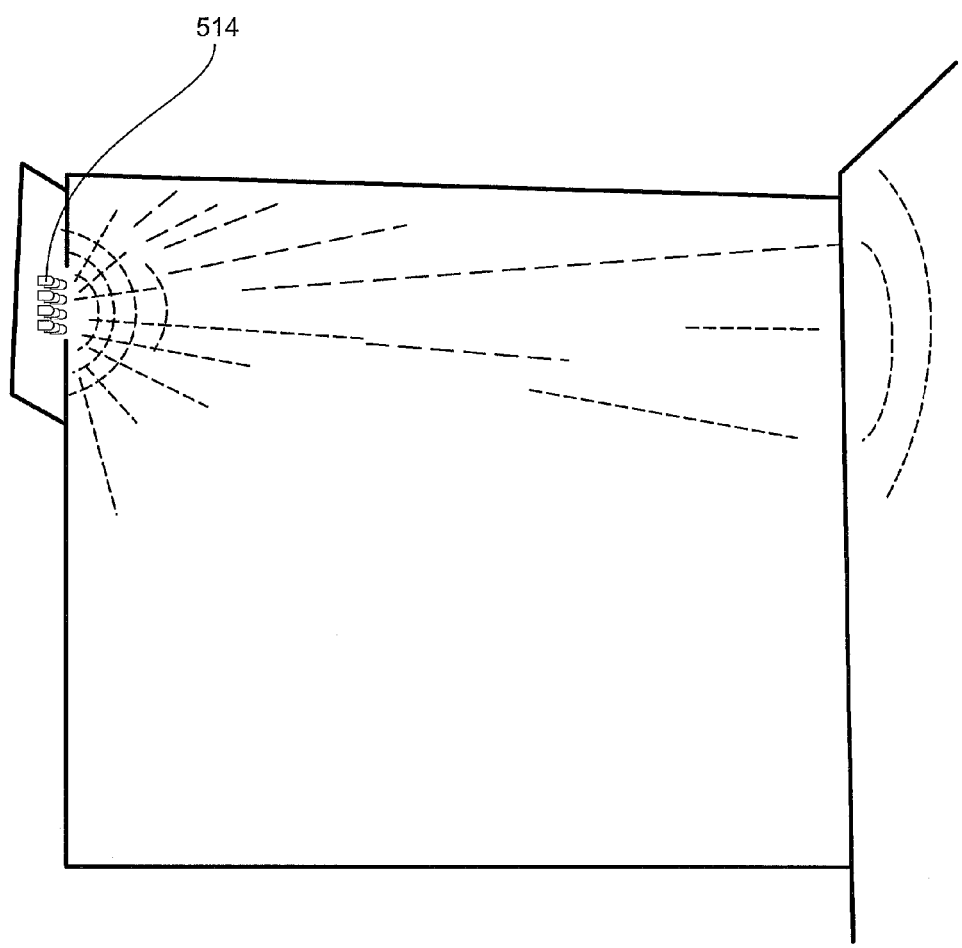
FIG. 6 shows the pattern of light that would occur if the lens was not present.

FIG. 6 shows that without the lens, the light from the light array 514 would simply go straight ahead.

Communication

The output from the processing and logic stage may be communicated to a remote location so that the output of the glow tube may be known. This remote location may receive communications from a number of transmitters to indicate the status of many different glow tubes on phases of different buses. One communication option is the use of power line carrier. Another option is to allow the SCADA system at the substation to connect to the relay outputs on the glow tube detection equipment. The information may be combined with the status of the substation breaker to look for unexpected problems.

Problem Detection

The processing and logic state 520 may be configured to examine the pattern of glow tube discharges across the three phases to look for a suspicious pattern. In the normal operation, there should be three phases with high voltage present as indicated by the detection of glow tube discharges or there should be none of the three phases with high voltage present. If just one or two phases have high voltage present, then either glow tubes for the remaining phases are not operating properly or there is some other equipment problem that merits investigation and repair.

Thus, if after you have disjunction of the glow tube values (on/off) for each phase, A OR B OR C should not equal (NOT A) OR (NOT B) OR (NOT C) as this equality indicates that not all three phases are in the same state with respect to the presence of high voltage. The problem may be a failure of a glow tube detector or a failure of the set of one or more glow tubes for a particular phase. The problem could be from some other abnormal condition such as back feed to some but not all phases.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A glow tube detection system for remote monitoring of light output from at least one glow tube, the glow tube detection system comprising:
    a light channeling device to channel an output of at least one monitored glow tube onto an array of at least one photo detector;
    a frequency filter that eliminates low frequency components from an output of the array of at least one photo detector;
    a threshold detector that detects that an output from the frequency filter indicates that at least one monitored glow tube is discharging light indicating a presence of voltage sufficient to create glow tube discharges;
    a logic unit that creates a logic output that indicates that the threshold detector has detected that at least one monitored glow tube is discharging light indicating the presence of voltage sufficient to create glow tube discharges;
    wherein the logic output
    continues to indicate that at least one monitored glow tube is discharging light indicating the presence of voltage sufficient to create glow tube discharges;
    after the threshold detector is no longer detecting that the output from the frequency filter indicates that at least one monitored glow tube is discharging light indicating the presence of voltage sufficient to create glow tube discharges;
    for a period sufficient to compensate for a glow tube that is flickering rather than operating properly; and
    a means for communicating the logic output from the logic unit to a device external to the glow tube detection system.

2. The glow tube detection system of claim 1 wherein the logic unit responds after a series of more than one light pulses are emitted from the at least one monitored glow tube.

3. The glow tube detection system of claim 1 further comprising a frequency filter that eliminates high frequency components from the output of the array of at least one photo detector.

4. The glow tube detection system of claim 1 wherein the light channeling device is a lens mounted on a cabinet wall of a cabinet to convey light energy from within the cabinet to the array of at least one photo detector located outside of the cabinet.

5. The glow tube detection system of claim 1 wherein the glow tube detection system provides at least one local visual indication of a status of the at least one monitored glow tube.

6. The glow tube detection system of claim 5 wherein a loss of power to the logic unit causes the at least one local visual indication of the status of the at least one monitored glow tube to indicate the presence of voltage sufficient to create glow tube discharges independent of an existence of actual glow tube discharges.

7. The glow tube detection system of claim 1 wherein the logic unit checks to see if at least one but not all three phases of three phase power has a glow tube discharging light to indicate the presence of voltage sufficient to create glow tube discharges.

* * * * *